United States Patent
Berger et al.

(10) Patent No.: US 11,196,238 B2
(45) Date of Patent: Dec. 7, 2021

(54) DEVICE FOR DETECTING CONTACT WITH AN ELECTRICAL CONDUCTOR, METHOD FOR IDENTIFYING CONTACT WITH AN ELECTRICAL CONDUCTOR, INSULATION STRIPPING MACHINE COMPRISING A DEVICE OF THIS KIND

(71) Applicant: SCHLEUNIGER AG, Thun (CH)

(72) Inventors: Patrick Berger, Steffisburg (CH); Raphael Deschler, Oberhofen (CH); Michael Jost, Thun (CH)

(73) Assignee: SCHLEUNIGER AG, Thun (CH)

( * ) Notice: Subject to any disclaimer, the term of this patent is extended or adjusted under 35 U.S.C. 154(b) by 0 days.

(21) Appl. No.: 17/255,619

(22) PCT Filed: Jul. 11, 2018

(86) PCT No.: PCT/IB2018/055117
§ 371 (c)(1),
(2) Date: Dec. 23, 2020

(87) PCT Pub. No.: WO2020/065366
PCT Pub. Date: Apr. 2, 2020

(65) Prior Publication Data
US 2021/0273427 A1    Sep. 2, 2021

(51) Int. Cl.
*H01R 43/05* (2006.01)
*H02G 1/12* (2006.01)
*G01N 27/02* (2006.01)

(52) U.S. Cl.
CPC ......... *H02G 1/1265* (2013.01); *G01N 27/028* (2013.01)

(58) Field of Classification Search
CPC .. H02G 1/1265; H01R 43/052; Y10T 29/514; G01N 27/028
See application file for complete search history.

(56) References Cited

U.S. PATENT DOCUMENTS

| 6,360,430 B1 * | 3/2002 | Stepan | H02G 1/1265 29/33 F |
| 7,597,030 B2 * | 10/2009 | Stepan | H02G 1/1265 81/9.42 |

(Continued)

FOREIGN PATENT DOCUMENTS

| EP | 3 121 918 A1 | 1/2017 |
| EP | 3 163 696 A1 | 5/2017 |
| WO | 2014/147596 A1 | 9/2014 |

OTHER PUBLICATIONS

International Search Report Corresponding to PCT/IB2018/055117 dated Apr. 5, 2019.

(Continued)

*Primary Examiner* — Alesa Allgood
(74) *Attorney, Agent, or Firm* — Finch & Mloney, PLLC; Michael J. Bujold; Jay S. Franklin

(57) ABSTRACT

A device for identifying contact with an electrical conductor by at least one electrically conductive tool (2*ra*, 2*rb*). The device comprises a tool holder (Ir) rotationally mounted about a rotation axis (X), and the tool (2*ra*, 2*rb*) arranged on the tool holder. The device additionally comprises an electrically conductive body (ECB) and a rotor-side inductive element (L1) arranged on the electrically conductive body (Ir). A parallel resonant circuit comprises at least one rotor-side circuit element (A), at least one stator-side circuit element (B), a stationary circuit arrangement (28) and a stator-side inductive element (L2). The rotor-side inductive element and the stator-side inductive element are arranged to measure characteristic oscillation parameters (φ, Am, f) of the parallel resonant circuit independently of the rotation speed of the tool holder (Ir). An insulation-stripping machine and a method for identifying contact with an electrical conductor by at least one electrically conductive tool as disclosed.

20 Claims, 7 Drawing Sheets

(56) References Cited

U.S. PATENT DOCUMENTS

| | | | |
|---|---|---|---|
| 9,475,669 B2 * | 10/2016 | Schutz | H01R 43/052 |
| 9,791,397 B2 | 10/2017 | Deschler et al. | |
| 10,551,337 B2 | 2/2020 | Viviroli | |
| 10,819,093 B2 | 10/2020 | Appenzeller | |

OTHER PUBLICATIONS

Written Opinion Corresponding to PCT/IB2018/055117 dated Apr. 5, 2019.

* cited by examiner

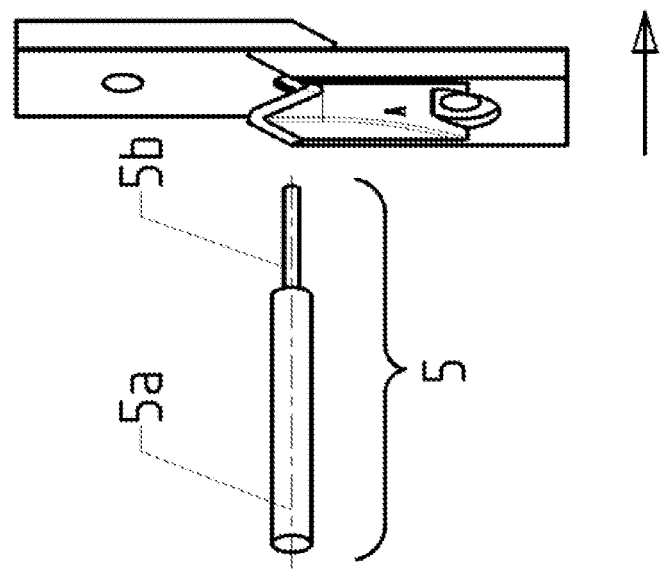
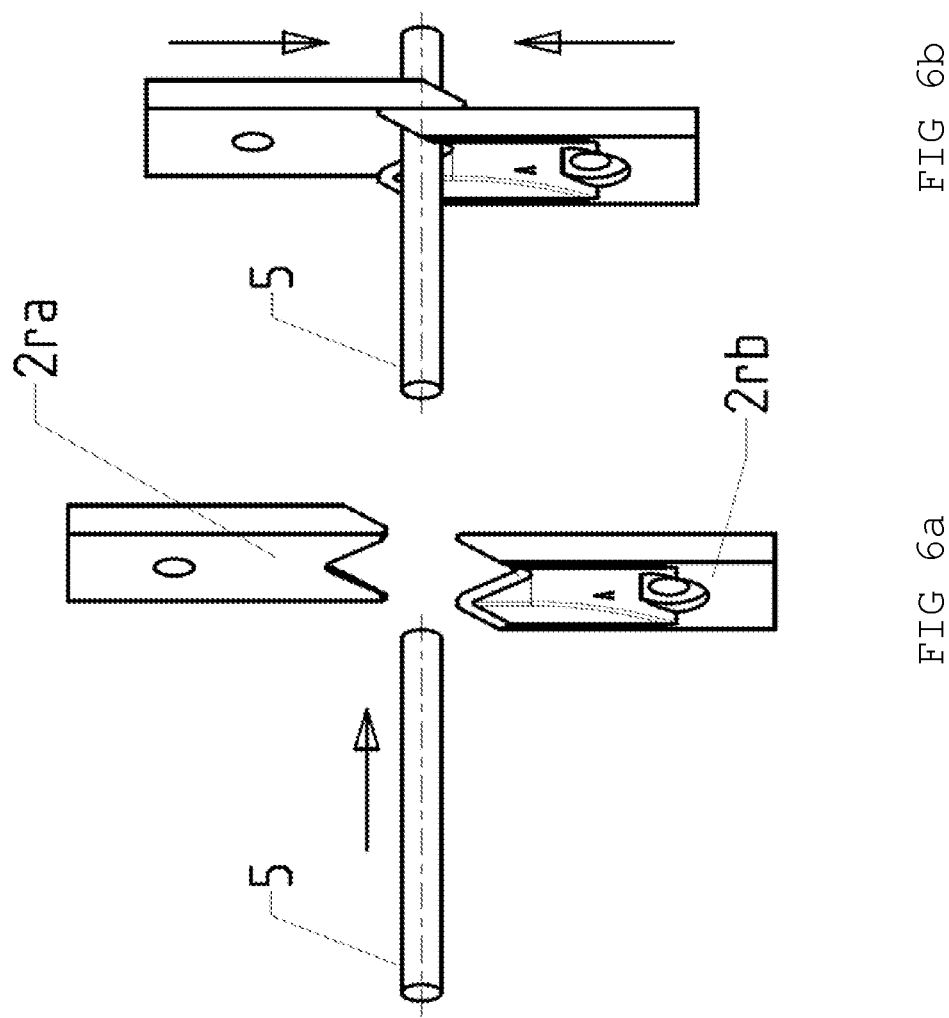
FIG 6a  FIG 6b  FIG 6c

DEVICE FOR DETECTING CONTACT WITH AN ELECTRICAL CONDUCTOR, METHOD FOR IDENTIFYING CONTACT WITH AN ELECTRICAL CONDUCTOR, INSULATION STRIPPING MACHINE COMPRISING A DEVICE OF THIS KIND

This application is a National Stage completion of PCT/IB2018/055117 filed Jul. 11, 2018.

FIELD OF THE INVENTION

The invention relates to a device for detecting contact with an electrical conductor by at least one electrically conductive tool, a method for identifying the contact with an electrical conductor by at least one electrically conductive tool, and an insulation stripping machine with at least one device for detecting the contact with an electrical conductor by at least one electrically conductive tool according to the independent claims.

BACKGROUND OF THE INVENTION

As the requirements regarding the quality of electrical cables have become increasingly strict, for the automobile or aviation industry for example, more and more often the slightest damage to the conductor such as scratches or scoring are considered to pose a risk, since damage of this kind together with the effects of vibration and/or corrosion can result in the conductor breaking. Accordingly, several suggestions have already been made in the field of cable processing machines for detecting tool-conductor contact. In cable insulation stripping machines, the tool is usually a blade.

Various apparatuses and methods for stripping insulation from electrical conductors are known from the related art.

For example, EP 3 163 696 A1 discloses a rotating insulation stripping machine for removing at least one layer of the cladding from electrical conductors. This is a device with rotating blades that cut into the cladding to strip the insulation. Rotational insulation stripping machines are insulation stripping machines in which the insulation stripping blades rotate about the longitudinal axis of the conductor from which the insulation is to be stripped.

From WO 2014/147596 A1, an apparatus is known for detecting contact with an electrical conductor by a non-rotating tool as the insulation-stripping blade. In the case of this apparatus, the insulation-stripping blade is connected to a circuit arrangement for detecting blade-conductor contact directly via electrical conductors. This apparatus cannot be used in its known form for a rotational insulation stripping head.

EP3121918A1 uses capacitive coupling for transmitting analogue measurement signals. This device is associated with substantial limitations. The mechanical implementation of the concentric capacitor rings with the air gap must be realised extremely precisely to ensure that no undue capacitance fluctuations which might be interpreted incorrectly as blade-conductor contacts occur during the insulation stripping process. Another disadvantage of the capacitive coupling described in EP3121918A1 is that its sensitivity is significantly limited by the large basic capacitors of the stationary and moving apparatus parts, thus making blade-conductor detection of short cables with small cross sections difficult or even impossible.

SUMMARY OF THE INVENTION

The object of the present invention is to remedy one or more of the drawbacks of the related art. In particular, it is intended to provide a device of the greatest possible simplicity, a method and an insulation-stripping apparatus with which it is possible to reliably detect contact by at least one electrically conductive tool with an electrical conductor that is to be stripped. It is particularly an object of the present invention to make available a rotationally cutting insulation stripping machine that enables the simple, reliable stripping of insulation from electrical conductors, in particular with a device for reliable and sensitive detection of blade-conductor contact, and thereby minimise and/or at least reliably report damage to electrical conductors during an insulation-stripping process.

This object is solved by the devices and methods defined in the independent patent claims. Further variants may be discerned from the dependent patent claims.

A device according to the invention for detecting contact with an electrical conductor, particularly such a conductor which is furnished with an electrically non-conductive cladding by at least one electrically conductive tool rotating around the electrical conductor comprises a tool holder which is rotationally mounted about a rotation axis. Here and in the following text, rotationally mounted means that a rotation of the tool holder about the rotation axis is possible in any direction and any angle from 0 to infinity degrees. The tool is arranged on this tool holder. The device comprises an electrically conductive body which is arranged on the tool holder. The electrically conductive body preferably comprises the tool holder and a hollow shaft. The electrically conductive body is electrically insulated from the tool, in particular by electrical insulation. The device further comprises a rotor-side inductive element which is arranged on the tool holder or on the hollow shaft, and a parallel resonant circuit with at least one rotor-side circuit element and at least one stator-side circuit element. The device comprises a circuit arrangement and a stator-side inductive element. The rotor-side inductive element is electrically connected to the tool and at least to the electrically conductive body via electrical conductors. All these elements form parts of the rotor-side circuit element of the parallel resonant circuit. At least the stator-side inductive element is arranged in the stator-side circuit element of the parallel resonant circuit. The stator- and rotor-side inductive elements are inductively coupled to each other. The stator-side circuit element of the parallel resonant circuit is connected to the circuit arrangement via electrical conductors for the purpose of detecting the change of at least one characteristic oscillation parameter, in particular the phase position and/or the phase shift of the parallel resonant circuit. The parallel resonant circuit has a total capacitance which functionally comprises at least the tool capacitance. Depending on the circuit design, the total capacitance may further comprise the conductor capacitance of the electrical conductors of the rotor-side circuit element and/or the conductor capacitance of the electrical conductors of the stator-side circuit element and/or an output capacitance of the circuit arrangement and/or an additional rotor-side balancing capacitor. It is possible that further stray capacitances and parasitic capacitances may influence the total capacitance, and these must be taken into account. The total capacitance can be set to desired initial values and the circuit elements tuned to each other by appropriate selection of the electrical conductors and/or an additional output capacitor and/or an additional rotor-side balancing capacitor. The tuning of the resonance frequencies of the rotor- and stator-side circuit element is advantageous particularly if the coupling factor of the inductive elements is low.

The rotor-side inductive element and the stator-side inductive element are arranged in relation to one another, in particular at a distance from one another and preferably contactlessly, in such a way that at least one of the characteristic oscillation parameters of the parallel resonant circuit can be measured independently or depending in a defined function on the rotation speed of the tool holder relative to the circuit arrangement of at least one of the characteristic oscillation parameters of the parallel oscillation circuit.

Characteristic oscillation parameters are for example the amplitude, the frequency and/or the phase shift between an input and an output signal, such as between a frequency generator signal and a stator-side resonant circuit signal, for example.

The electrical conductors for connection to the tool may be cables. However, it is also conceivable that they may simply be conductor tracks, on a printed circuit board for example, or electrical connections created by soldering, plug connectors, rivets, pins or threaded connectors. If the electrical connections are cables, they may be connected to the tool by plugging or screwing, for example by means of cable lugs.

At least the tool, the electrical insulation, the electrically conductive body, the electrical conductors of the rotor-side circuit element with the capacitors thereof and the rotor-side inductive element are parts of the rotor-side circuit element. The parts of the stator-side circuit element include preferably the stator-side inductive element, the electrical conductors of the stator-side circuit element with the capacitors thereof, and the circuit arrangement.

The parts of the rotor-side circuit element of the parallel resonant circuit are arranged on the rotationally mounted tool holder, and the parts of the stator-side circuit element of the parallel resonant circuit, in particular the stator-side inductive element and the stationary circuit arrangement, are preferably arranged on a stationary part of the insulation stripping machine.

The electrically conductive body may comprise the entire tool holder. This means that the electrically conductive body is identical with the tool holder. However, it is equally conceivable that only a part of the tool holder is embodied as the electrically conductive body, and/or the tool holder consists at least in part of a non-conductive material. Examples of non-conductive materials are ceramics, in particular technical ceramics or plastics.

The tool holder and the electrically conductive body may be constructed as separate elements. Thus for example it is conceivable that the electrically conductive body may simply have the form of a hollow shaft, ring or disc on the tool holder. It is also conceivable that just a coating over at least one region of the tool holder is provided as the electrically conductive body.

The electrical insulation between tool and electrically conductive body may have the form of a foil, for example, which at least partially surrounds the tool and insulates it from a tool holder, which is constructed as the electrically conductive body. It is also possible that the electrical insulation is embodied as a separate element which is arranged between the tool and the electrically conductive body. The tool holder constructed as the electrically conductive body might also be furnished with an electrically non-conductive coating which serves as insulation. In such case, it is conceivable that the electrical insulation is embodied at least as a part of the tool holder, in particular in the case in which only a part of the tool holder is constructed as an electrically conductive body, or the electrically conductive body is constructed as a separate element, such as a hollow shaft, for example.

Together with its environment, in particular with the electrical insulation and the electrically conductive body, or with the tool holder depending on the embodiment, the electrically conductive tool functions as the tool capacitance within the rotor-side circuit element of the parallel resonant circuit.

The electrical conductor and electrically non-conductive cladding are typically parts of a cable or ultimately give access to a cable.

The arrangement of the rotor-side and stator-side circuit elements which are coupled to a parallel resonant circuit as described herein makes it possible for the device to measure oscillation parameters of the parallel resonant circuit independently of the rotation speed of the tool holder.

The one or more tools may have the form of one or more blades, in particular insulation-stripping blades. The tools are preferably two insulation-stripping blades arranged opposite one another, constructed in a V-shape and overlapping one another, particularly in in the closed state. It is also conceivable that the opposing blades each have one straight cutting edge, and the two edges meet when the blades are in the closed state. It is conceivable to use more than two blades. An arrangement of multiple blades in the form of an iris diaphragm is conceivable.

The rotor-side and the stator-side inductive elements are preferably embodied as coil, wherein these coils are inductively coupled with each other.

Coils are easily manufactured components. Signals can be transmitted contactlessly by means of the inductive coupling.

Changes in the properties, particularly the impedance of the rotor-side circuit element, brought about by contact between tool and conductor are affect the entire parallel resonant circuit directly. This enables a contactless evaluation of the rotor-side circuit element via the stationary circuit arrangement using the characteristic oscillation parameters of the parallel resonant circuit, in particular the phase shift.

The inductive coupling within a parallel resonant circuit as described in the present document makes it possible to detect and transmit a signal without the need for complicated modulation or conversion of the signal before or during the inductive coupling.

The rotor-side and the stator-side inductive elements may be arranged coaxially with the rotation axis of the tool holder and may at least partially overlap one another.

This makes it possible to produce a device of compact construction and to tune the rotor-side and stator-side inductive elements to each other reliably.

The stator-side inductive element may have the form of a toroidal coil. The rotor-side Inductive element may have the form of a toroidal cell which is coaxial with this toroidal coil. These toroidal coils may partially overlap one another.

Toroidal coils can be produced simply and with great precision.

The toroidal coils preferably overlap each other completely. This favours the inductive coupling and allows a compact construction.

The rotor-side and stator-side inductive elements may have a cylindrical or plane-parallel construction coaxial with the rotation axis of the tool holder. This makes it possible to manufacture the apparatus using a desired construction method which is compatible with a corresponding insulation stripping machine.

The rotor-side and/or stator-side inductive elements may be embodied as a winding or as a spiral imprint of an electrical conductor on an electrically non-conductive and non-magnetic material. The material is preferably plastic, such as for example POM, PEEK or FR4. This enables an inexpensive, simple construction of the coils, and plastic has no effect on the magnetic field of the coils. The formation of the inductive elements on an corresponding material also enables a thermally stable coupling.

Alternatively, the rotor-side and/or stator-side inductive elements may include a ferromagnetic material, particularly in order to improve the inductive coupling. The ferromagnetic material amplifies and directs the electromagnetic field, with the result that the same size structure is able to deliver greater coupling and inductivity with a small stray field, so that in turn the effect of magnetically conductive machine parts in the area around the coils is reduced significantly.

The rotor-side and/or stator-side inductive elements may be embodied as single single-layer coils. However, it is also conceivable that the rotor-side and/or stator-side inductive elements may be embodied as multilayer coils.

This in turn enables a desired compact construction and/or improvement of the coupling.

The tool may be embedded between two conductive plates. The conductive plates are connected electrically to the rotor-side inductive element via the electrical conductors. Additionally, the are electrically insulated from the electrically conductive body, in particular by the electrical insulation. This makes it possible to establish a connection between the tool and the rotor-side inductive element.

It is also conceivable that the tool is connected to the rotor-side inductive element by means of at least one electrical sliding contact and via the electrical conductors. In this context, the electrical sliding contact may consist of electrically conductive plates, springs, spring pins or rings. The tool is then electrically insulated from the electrically conductive body. This enables an alternative way to establish a simple electrical connection between the tool and the rotor-side inductive element. This in turn enables the position of the tool to be changed, in particular an approach of the tool may be enabled by means of a straight-line movement or a swivelling motion.

A further aspect of the invention relates to an insulation stripping machine with at least one insulation-stripping blade as a tool. The insulation-stripping blade is held by a tool holder which is mounted so as to be rotatable about a rotation axis and is connected to at least one device such as is described in this document for detecting the contact by an electrical conductor of a cable. The device is connected to at least one of the tools.

This enables the creation of a complete insulation-stripping machine, wherein the device for detecting contact of an electrical conductor is tuned correspondingly to this insulation stripping machine and account is taken of the specific machine parameters.

As the person skilled in the art knows, the immediate surroundings of a parallel resonant circuit, that is to say the elements that do not belong to the parallel resonant circuit as such, influence the behaviour of the parallel resonant circuit. This happens when these peripheral elements of the parallel resonant circuit influence and changed the electrical and/or magnetic stray fields of the parallel resonant circuit. With regard to the overall construction of an insulation stripping machine, it must therefore be ensured that the peripheral elements do not affect either the electrical or the magnetic stray fields to an unacceptable extent while the insulation stripping machine is in operation, to prevent impermissible detuning of the parallel resonant circuit. Detuning of the parallel resonant circuit can result in false detections or changes in the sensitivity of the measuring system.

A further aspect of the present invention relates to a method for detecting the contact of an electrical conductor, in particular of such a conductor furnished with an electrically non-conductive cladding, by at least one electrically conductive tool rotating about the electrical conductor, with a device particularly such as is described in this text. The device comprises a tool holder which is mounted rotationally about a rotation axis. The tool is arranged on this tool holder. The device also comprises an electrically conductive body which is arranged on this tool holder. The electrically conductive body preferably comprises the tool holder and a hollow shaft. The device further comprises a rotor-side inductive element, a parallel resonant circuit, a stationary circuit arrangement and a stator-side inductive element. The tool is insulated from the electrically conductive body by an electrical insulation. The rotor-side inductive element is arranged on the tool holder or on the hollow shaft. The parallel resonant circuit includes at least one rotor-side circuit element and at least one stator-side circuit element. The rotor-side inductive element is connected electrically to the tool and at least with the electrically conductive body via electrical conductors. The rotor-side inductive element and the electrical conductors constitute parts of the rotor-side circuit element of the parallel resonant circuit. At least the stator-side inductive element is arranged in the stator-side circuit element of the parallel resonant circuit. The stator-side circuit element of the parallel resonant circuit is connected via electrical conductors to the circuit arrangement for detecting the change in at least one characteristic oscillation parameter, in particular the phase shift and/or phase position. The parallel resonant circuit has a total capacitance which functionally comprises at least the tool capacitance. Depending on the circuit design, the total capacitance may further comprise the conductor capacitance of the electrical conductors of the rotor-side circuit element and/or the conductor capacitance of the electrical conductors of the stator-side circuit element and/or an output capacitor. It is possible that further parasitic capacitances may influence the total capacitance, and these must be taken into account. The total capacitance can be set to desired initial values by appropriate selection of the electrical conductors and/or an additional output capacitor.

The method for detecting a blade-conductor contact comprises at least the following steps:

Setting a frequency generator signal in accordance with a defined sensitivity in the range of the resonant frequency of the parallel resonant circuit, preferably below the resonant frequency of the parallel resonant circuit Measuring at least one characteristic oscillation parameter of the parallel resonant circuit such as phase position, phase, frequency and amplitude, and determining the limit value thereof for contact of the conductor by the tool Rotating the tool holder relative to the stationary circuit arrangement Continuously measuring at least this characteristic oscillation parameter of the parallel resonant circuit, in particular the phase position and/or phase shift, and continuously comparing these measurement values with the one or more limit value(s) defined by reference measurements to detect a contact of the conductor by the tool.

In this context, a continuous measurement may be a permanent measurement or a clocked measurement, that is to say a multiplicity of single measurements, in particular a multiplicity of the same measurements taken at a certain temporal interval over a certain period of time.

This method is typically part of a process in cable preparation. It enables detection of the contact of a conductor by a tool without the need to establish a galvanic connection between the tool and the circuit arrangement.

The resonant frequency of the parallel resonant circuit is preferably determined before the frequency generator signal is set by measuring an amplitude response and/or frequency response within the frequency spectrum in which the resonant frequency must lie based on the characteristics of the system and/or experience. When the frequency generator signal is set below the resonant frequency of the parallel resonant circuit, depending on the application the frequency generator signal may be between 1% and 10%, preferably between 1% and 5%, more preferably between 5% and 1%.

Preferably, after the tool holder has begun rotating, the tool is moved towards the conductor and cuts into the electrically non-conductive cladding of the conductor.

Preferably, when the limit value is reached or exceeded, a signal is output with which at least one function of an insulation stripping machine can be controlled.

The limit value may be a predefined value, which the actual value falls below, progressing from a higher starting value to a lower value, or exceeds, rising from a lower value to a higher value. In this context, it is also possible that the limit value may be a defined deviation from a constant signal, and exceeding this latter limit value constitutes exceeding the permissible deviation from a reference value.

At the same time, of course it is also conceivable that only one signal is transmitted, in order to actuate an alarm lamp or emit an alarm, for example.

In this way, it is possible to control and/or regulate the subsequent insulation stripping process of the insulation stripping machine or the subsequent process relating to the control of the device, in particular to bring about a specific action such as stopping the movement of the tool, retracting the tool, stopping the rotational movement of the tool holder, etc.

Typically in an insulation stripping process, in a first step a conductor from which the insulation is to be stripped is placed between the tools. As soon as the conductor from which the insulation is to be stripped is in the correct position, it is held fast by a suitable apparatus, typically by means of centring jaws. It is also conceivable that the conductor from which the insulation is to be stripped is first held fast in the suitable apparatus and then placed between the tools by said apparatus. In a following step, the tools are preferably moved towards each other to cut into the electrically non-conductive cladding of the conductor or cut it open.

One or more of the process steps described above from the typical insulation stripping process is/are preferably combined or can be combined with the method for detecting a conductor contact as described in this document.

Following the aforementioned steps, the electrically conductive tools, which are preferably embodied as insulation stripping blades, and the conductor are moved along the rotation axis, which is typically coincident with the longitudinal axis of the conductor from which the insulation is to be stripped, relative to each other in such a way that the cut cladding is stripped off the conductor. In this context, it is conceivable to open the tools slightly before the stripping, particularly if a contact has been detected.

The stripping of the cladding may be carried out completely or only partially. In the case of partial stripping, the cladding still remains on the electrical Conductor, but is displaced axially to its original location on the electrical conductor.

The measurement may also be continued while the cladding is being stripped, so that a contact with the electrical conductors by a tool may also be detected in this phase.

The circuit arrangement preferably evaluates the phase position and/or the phase shift between the stator-side resonant circuit signal and the frequency generator signal.

The evaluation of the phase position or the phase shift can be carried out using a phase detector with simple means and thus delivers a rapid response in the event of a contact between the tool and the electrical Conductor.

During initialisation, the frequency of the frequency generator is set slightly lower than the natural frequency of the resonant circuit, so that the resonant circuit operates at a higher speed than the frequency generator. However, if the tool touches an electrical conductor that is being processed, the resonant circuit becomes slower due to the extra capacitive load. This digital phase position determination of faster and slower operating speeds is stable and rapid. The difference between the resonant circuit natural frequency and that of the frequency generator thus defines the sensitivity of the circuit arrangement.

An evaluation of the resonant circuit amplitude or the phase shift between the stator-side resonant circuit signal and the frequency generator signal or a combination thereof to further enhance stability or as a plausibility check is also possible.

In this context, it is conceivable that the time at which the conductor was contacted by the tool and the length of time for which the conductor was contacted by the tool may be captured as separate parameters.

Particularly when additional time-related process data is taken into account, it then becomes possible to make a statement about the depth of the damage to the conductor when contact has occurred. This in turn enables the conductor in question which was being processed to be categorised. In particular, the data obtained during cutting may be used to draw a conclusion about the depth of the conductor damage and/or the contact diameter can be investigated and evaluated.

It is also conceivable that the location of the contact of the conductor by the tool in the direction of the rotation axis is captured in particular as a separate parameter.

This enables a statement to be made about the site where the conductor is damaged if a contact has occurred. This in turn enables the conductor in question which was being processed to be categorised. In particular, the data obtained during stripping of the insulation from the conductor may be used to draw a conclusion about the length of any damage to the conductor.

It is also possible to capture two or more parameters simultaneously and/or to combine them.

With the aid of this information, the operator can define one or more rejection criteria. If damage should fall within acceptable values, it is permissible to continue using the processed conductor despite the damage.

This also allows a statement to be made about what percentage of the insulation-stripping operations were carried out correctly, or what percentage of the insulation-stripped conductors have or may have damage for example, and/or how serious the damage is.

In the course of the method, it is possible in addition or alternatively for the position of the tools relative to a starting position of the tools or relative to the rotation axis to be captured, and in particular captured continuously and compared with reference values at the point in time of contact between the tool with the conductor. The diameter of the electrical conductor may then be determined on the basis of reference values for the diameters. At the same time, the determination of the depth to which the tools penetrated the conductor for example is also made easier.

In this way, it is possible for example to identify the conductor with an insulation stripping test, and to configure the machine with this at the start of the insulation stripping process. It is also possible to adapt the parameters during operation. This may be necessary if the diameters of the conductor are subject to production-related fluctuations.

Due to manufacturing tolerances, it is possible that the electrical conductor is not disposed coaxially with the electrically non-conductive cladding inside said electrically non-conductive cladding. In other words, the thickness of the electrically non-conductive cladding may vary over the circumference of the conductor. If an electrically insulated conductor which is affected by manufacturing tolerances of such kind is clamped in an apparatus, it is possible that the electrical conductor is not aligned along a central axis in the clamping apparatus. With regard to an insulation stripping machine, this means that the electrical conductor is arranged eccentrically relative to the rotation axis.

It is also conceivable that the rotation axis of the tools and the central axis of the clamping apparatus are not congruent due to manufacturing and assembly tolerances. Consequently, an electrical conductor which is ideally manufactured completely coaxially is also disposed eccentrically to the rotation axis.

In the course of the method, and particularly when cutting into the electrically non-conductive cladding, an eccentricity vector and the conductor diameter can be calculated using the tangential cut method. In this method, the distance between the tool and the rotation axis is additionally or alternatively decreased progressively until a first point of tangential contact of the conductor by the tool occurs. Then, the angular position of the tool and the disposition of the tool can be saved to memory. The disposition of the tool, in the present case the distance between the tool and the rotation axis, is equivalent to an associated first contact radius. With this, in the case of a conductor disposed eccentrically to the rotation axis it is possible to determine the point that is farthest from the rotation axis, both in terms of a radial distance from the rotation axis and relative to the polar angle.

Preferably, the distance between the tool and the rotation axis is then reduced further, until a continuous contact of the conductor by the tool takes place for a full revolution of the tool about the conductor. In such case, the disposition of the tool, in this case the radiale distance between the tool and the rotation axis may be saved to memory as a second contact radius. This makes it possible to determine a point on the conductor which is located closest to the rotation axis.

Preferably, an eccentricity vector is calculated from the first contact radius and the second contact radius as well as the angular position. This enables the calculation of the position of the conductor's longitudinal axis with respect to the rotation axis.

A further, universal method for determining an eccentricity vector and a conductor radius is the sickle cut method. In this method, preferably a distance of the tool from the rotation axis is decreased progressively until the first point of tangential contact of the conductor by the tool occurs. At least the radial disposition and optionally the angle of this first point of tangential contact of the tool are saved to memory. The distance of the tool from the rotation axis is further reduced to a sickle cut radius, until a contact of the conductor by the tool over a sickle cut angle of preferably 120° to 200° occurs. The start of the contact is saved as the first sickle cut contact angle and the end of the contact is saved as the last sickle cut contact angle.

Preferably, a conductor radius, an eccentricity and an eccentricity vector are then calculated from the first contact radius, the sickle cut radius, the first sickle cut contact angle and the last sickle cut contact angle.

With these, it is possible to determine the position of the conductor relative to the rotation axis.

In a further step, the conductor may be shifted relative to the rotation axis on the basis of the eccentricity vector in such manner that an eccentricity is compensated. This means that the axis of the conductor is coaxial with the rotation axis in the next processing step.

This method is preferably applied with a rotational cable insulation stripping machine such as described in this document, in particular with insulation stripping machines for coaxial, triaxial or simple stranded cables.

The electrical conductor is preferably an electrically conductive layer of a coaxial or triaxial cable. The steps as described in the present method may be repeated for single layers of a coaxial or triaxial cable. In this way, it is possible to determine the diameters and/or eccentricity vectors of the individual conductive layers.

With the present method, it is also conceivable that the point in time of contact with the conductor by the tool and the duration of the contact with the conductor by the tool are captured separately for each tool. This enables an accurate determination/categorisation of the conductors and/or damage to the conductors.

It is further conceivable that the respective contact diameter is calculated for each tool. On the basis of these calculated contact diameters, the tools can be adjusted radially with reference to the rotation axis in such manner that each blade is at the same distance from a longitudinal axis of the electrical conductor. In such a case, it is conceivable that the adjustment of the tools takes place while the system is operating, that is to say while the tool is rotating. However, it is also conceivable that the tools are adjusted manually such that they are at the same distance from the rotation axis.

It is further conceivable that the present method for adjusting rotation axis and clamping apparatus is applied during installation. For this purpose, for example the clamping apparatus may be adjusted with setscrews or adjusting means in accordance with the eccentricity vector and these may then be fixed in accordance with this setting.

It is also possible to implement active correction during the insulation stripping process, by displacing the clamping apparatus according to the eccentricity vector by means of actuators.

BRIEF DESCRIPTION OF THE DRAWINGS

In the following, the invention will be explained in greater detail with reference to figures, which only represent exemplary embodiments. In the drawing:

FIGS. 6a to 6c show a schematic flowchart of an insulation stripping process;

DETAILED DESCRIPTION OF THE PREFERRED EMBODIMENTS

Figure 1:
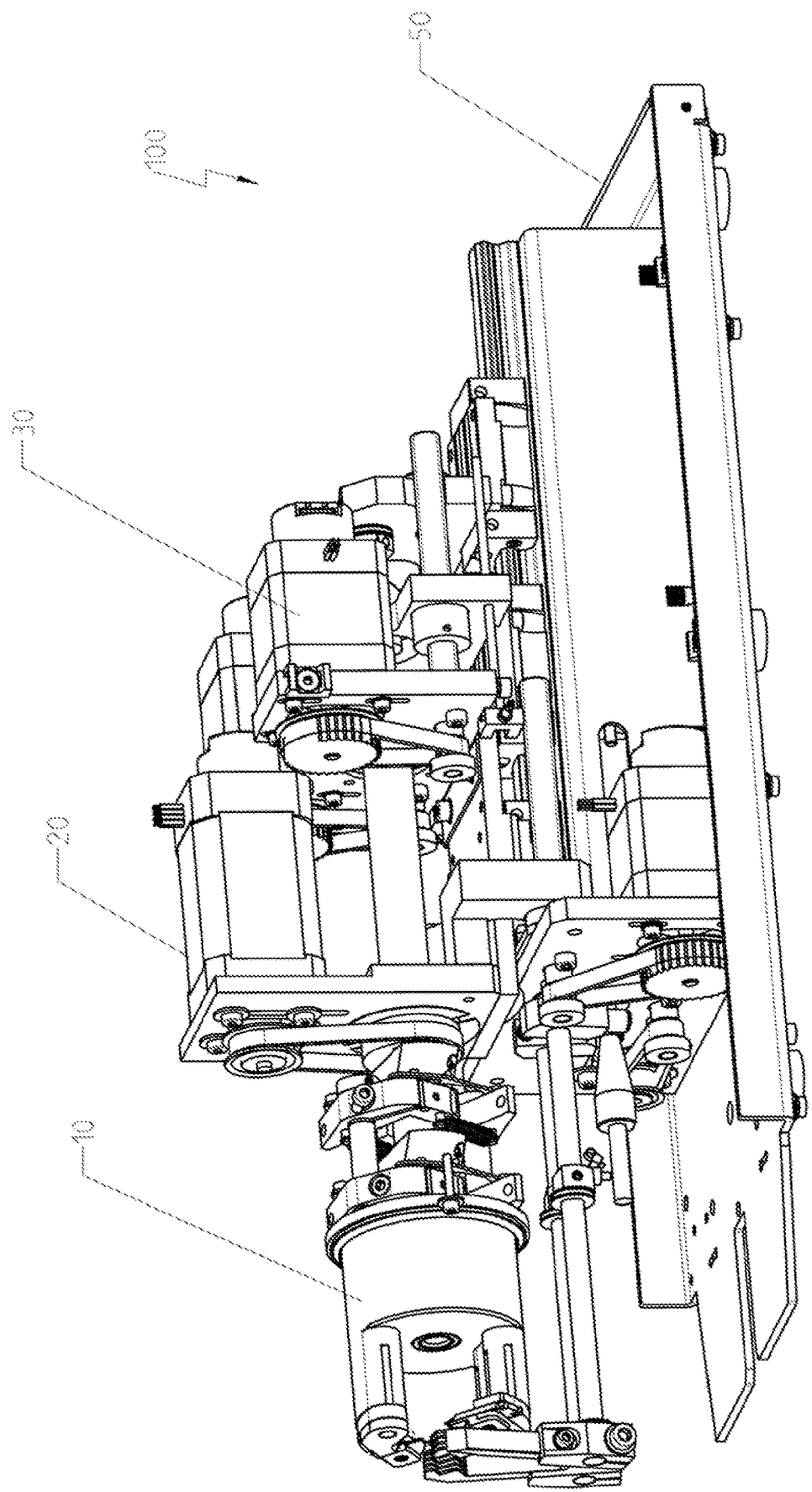
FIG. 1 is a perspective view of an insulation stripping machine.

FIG. 1 shows a perspective view of a rotational insulation stripping machine 100. The insulation stripping machine 100 comprises an insulation-stripping head 10 with blades 2ra and 2rb arranged thereon (see FIG. 2), drive means 20 for the insulation-stripping head 10 and drive means 30 for the blades of the insulation-stripping head 10. The insulation stripping machine 100 has a frame 50, on which the components are mounted. The insulation stripping machine 100 comprises a device for detecting the contact of an electrical conductor by at least one electrically conductive tool 2ra, 2rb (see FIG. 2), also called blade-conductor contact.

Figure 2:
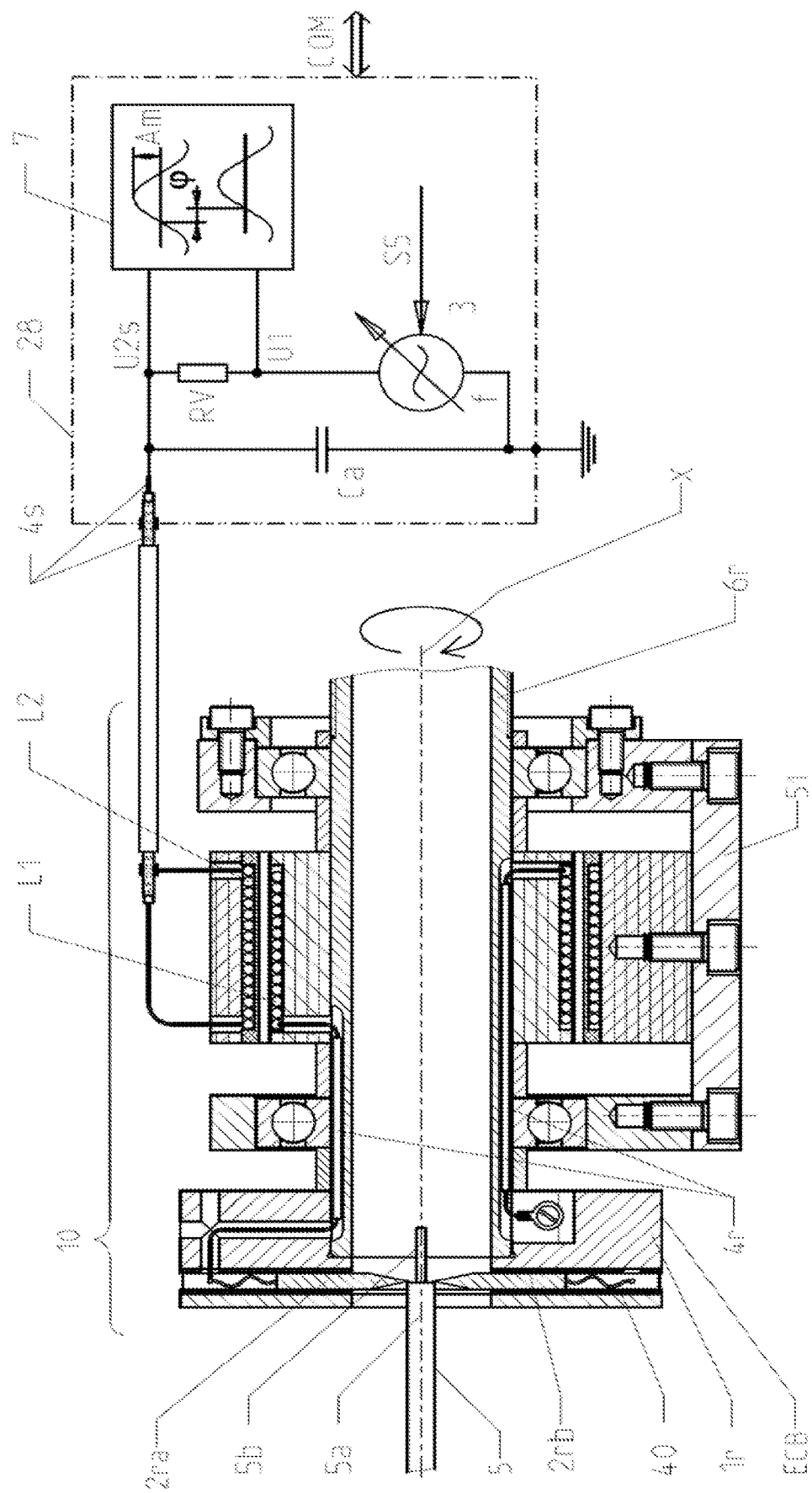
FIG. 2 shows a cross section along the rotation axis of an insulation stripping machine.

FIG. 2 is a schematic representation of a cross section along the rotation axis X of a rotational insulation stripping machine 100 (see FIG. 1). In the present case, the insulation-stripping head 10 is constructed as a hollow body and is connected to the hollow shaft 6r and mounted rotatably about the rotation axis X. In the left area of FIG. 2, two blades are depicted as electrically conductive tools 2ra, 2rb, between which the electrical conductor 5b to be stripped is arranged. The electrical conductor 5b is furnished with an electrically non-conductive cladding 5a. The blades 2ra, 2rb are mounted so as to be radially displaceable on the rotatable tool holder 1r. This means that the blades 2ra, 2rb can be moved towards each other by rotating about the axis X, with the result that they cut into the electrically non-conductive cladding 5a of the electrical conductor 5b. The blades 2ra, 2rb are insulated from the tool holder 1r by an electrical insulation 40. In this case, the electrical insulation 40 consists of two thin ceramic plates, each having a thickness of for example 0.5 mm, which surround the blades.

In the present case, the tool holder 1r is embodied as electrically conductive body ECB. A rotor-side inductive element as coil L1 is mounted on the hollow shaft 6r. In the present case, the coil L1 is constructed as a single-layer coil. A stator-side inductive element is arranged coaxially with this rotor-side inductive element. In the present case, the stator-side inductive element is also constructed as a single-layer coil L2. The two ends of the rotor-side coil L1 are connected to the two blades 2ra, 2rb via an electrical conductor 4r. In the present case, the connection between the conductors 4r and the blades 2ra, 2rb is realised as a threaded connection. The second end of the coil L1 is connected electrically to the tool holder 1r and the hollow shaft 6r, and in this case these elements together form the electrically conductive body ECB. These elements constitute the rotor-side circuit element A (see FIGS. 3 and 4) of the parallel resonant circuit. The stator-side coil L2 is connected via its ends to the stationary circuit arrangement 28 via a coaxial cable 4s. The coil L2 is mounted on a mounting plate 51 as part of the insulation stripping machine 100. This means that the stator-side coil L2 is mounted immovably. The rotor-side coil L1 and the stator-side coil L2 are arranged at a distance from each other.

The stationary circuit arrangement 28 comprises a frequency generator 3, a phase detector 7 and a series resistor Rv. The frequency generator 3 can be controlled or regulated with a control device 17 (see FIG. 5) via the signal 55. The phase detector 7 captures the input signals U25 and U1. The stationary circuit arrangement 28 also includes an output capacitor Ca. Communications with the circuit arrangement 28 are assured via an interface COM.

Figure 2B:
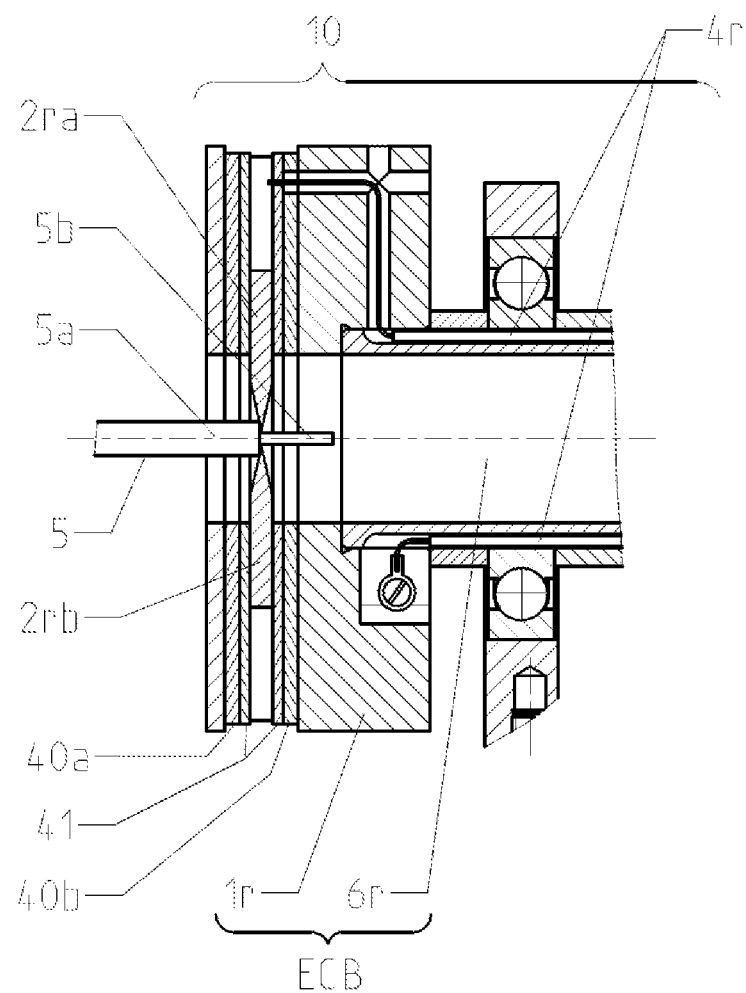
FIG. 2b shows the cross section of FIG. 2 in an alternative layout.

FIG. 2b shows the cross section of FIG. 2 in an alternative layout. Only the front area of the insulation-stripping head 10 is shown. Otherwise, the same reference signs denote the same elements as were described previously for FIG. 2. For the sake of clarity, these are not repeated in the description of FIG. 2b, and only the elements that differ from those in FIG. 2 are described. In FIG. 2b, the tools 2ra and 2rb are also embodied as blades. They are each arranged between two electrically conductive plates 41, which in turn are mounted on an electrical insulation in the form of two plates 40a and 40b. In the present case, the tools 2ra and 2rb are not connected directly to the coil L1, rather they are only connected by brushing the electrically conductive plates 41. The electrically conductive plates are connected to the coil L1 via the electrical conductor 4r. The connection between the electrical conductor 4r and the electrically conductive plates 41 is represented as a soldered connection.

Figure 3:
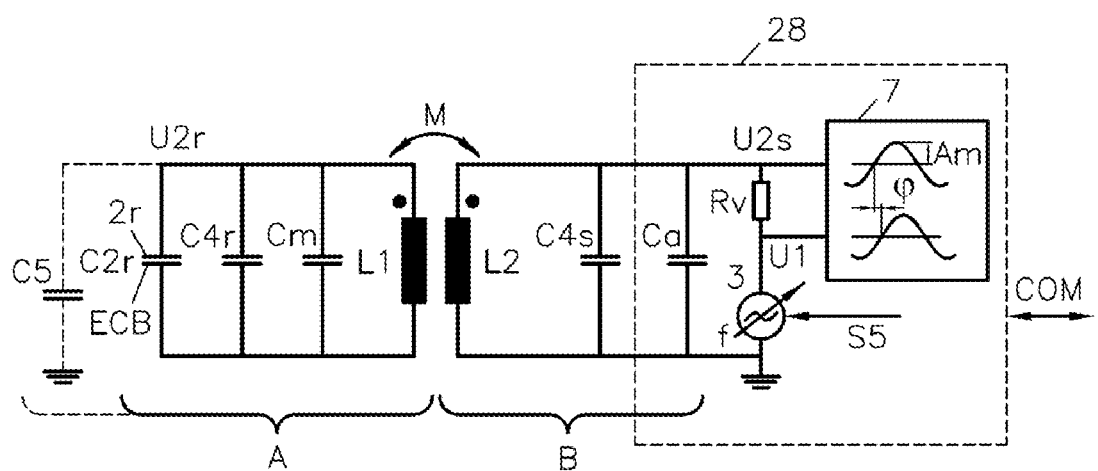
FIG. 3 shows a circuit diagram of the parallel resonant circuit with circuit arrangement.

FIG. 3 is a schematic representation of a device for detecting the contact of an electrical conductor by at least one rotating electrically conductive tool 2r. The parallel resonant circuit is divided into a circuit element A and a circuit element B, these elements being coupled inductively.

The parallel resonant circuit is preferably a high-quality parallel resonant circuit. A high-quality resonant circuit for this application is typically a resonant circuit with a quality factor greater than 5.

C2r represents the tool capacitance, C4r the rotor-side and C4s the stator-side cable capacitors. Together with the output capacitor Ca of the circuit arrangement 28 and the balancing capacitor Cm, the resonant frequency of the global resonant circuit can be adjusted and preferably the resonant frequencies of the circuit elements can be tuned to each other or selected similarly.

In the circuit diagram as shown, the capacitor C5 represents the capacitance of the conductor 5b being processed to earth (see FIG. 2 on this point).

The parallel resonant circuit is excited by the frequency generator 3 with a frequency generator signal U1 across series resistor Rv below its resonant frequency. The control device 17 (not shown here see FIG. 5 for more information) controls the frequency generator 3 with an input signal 55 so that the parallel resonant circuit oscillates at a frequency below its resonant frequency when the blades are in the open position.

If one of the blades comes into contact with the electrical conductor 5b while cutting into or stripping off the insulation 5a, the capacitor C5 of the cable to be processed is switched in parallel to the resonant circuit capacitor Ct.

This in turn increases the total capacitance Ct and the LC resonant circuit is detuned. The newly resulting resonant frequency with capacitor C5 is lower than the original resonant frequency of the parallel resonant circuit. In this case, with the frequency of the frequency generator 3 unchanging, a new phase shift arises between the frequency generator signal U1 and the stator-side resonant circuit signal U25 as well as a new amplitude value Am from U25. This phase shift is converted to an analogue voltage U4 by a phase detector 7, and input for example from the aforementioned control device. It is also possible to generate a digital logic signal S4 (see FIG. 5 for more details) which indicates whether the frequency generator signal U1 is operating faster then the resonant circuit signal U25 or not. The value of signal S4 changes according to the frequency set for the frequency generator signal U1 and the additional capacitor C5. This will be explained with reference to FIG. 5.

Figure 4:
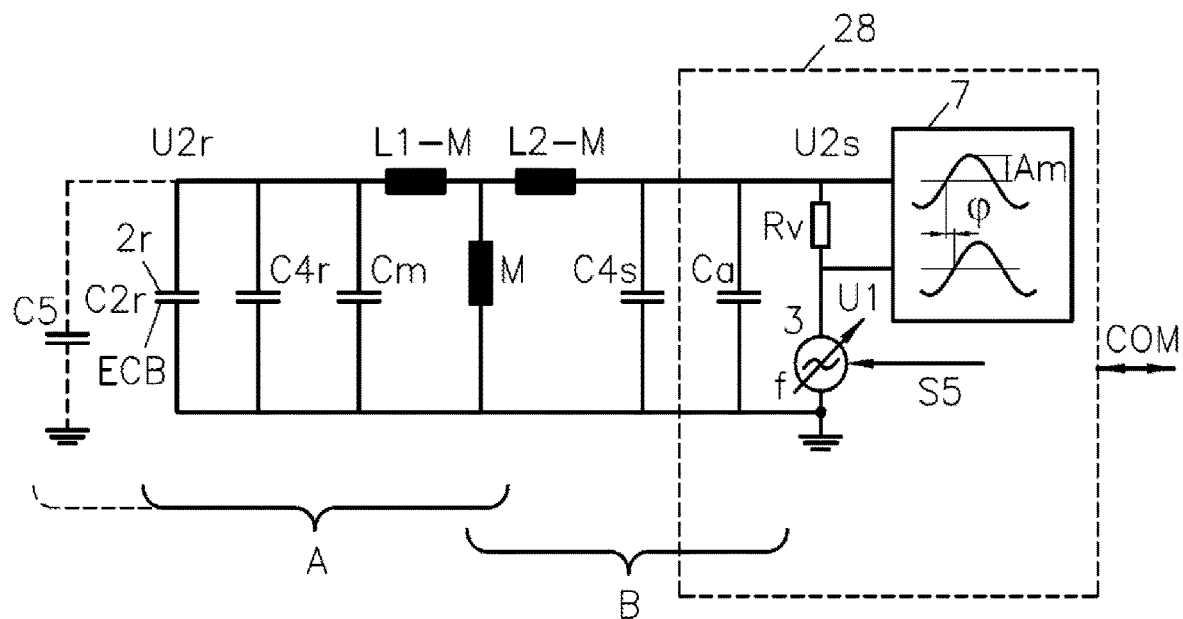
FIG. 4 shows an equivalent circuit diagram for the parallel resonant circuit of FIG. 3.

FIG. 4 shows a different schematic illustrative form of the parallel resonant circuit of FIG. 3. The coils L1 and L2 which are coupled to one another inductively in FIG. 3 are represented by the equivalent circuit diagram of the coreless and lossless transformer.

Figure 5:
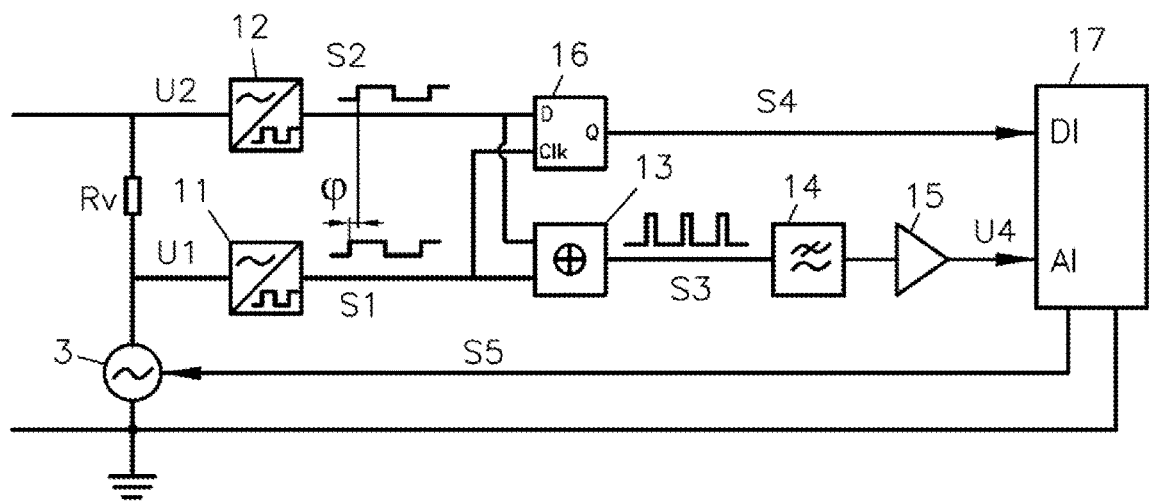
FIG. 5 shows a circuit diagram of a phase detector.

FIG. 5 shows an embodiment of phase detector 7. The phase detector is equipped with two comparators 11 and 12. An XOR gate 13 and a D flip-flop 16 are connected downstream therefrom. As was explained with reference to FIG. 2, the parallel resonant circuit is excited by the frequency generator 3 at a frequency slightly lower than its resonant frequency. The frequency generator voltage is preferably sinusoidal.

Thus, the signals of the frequency generator U1 and the stator-side resonant circuit U25 are present at the input of the phase detector. They are converted into the square wave signals S1 and S2 by the comparators 11 and 12, which are linked to each other by an XOR gate 13. This generates the square wave signal S3 whose switch-on period ratio is proportional to the phase shift between U1 and U25. A low pass filter 14 and an amplifier 15 are connected downstream from the XOR gate 13. The signal is filtered through the low pass filter 14 and amplified by the amplifier 15. This analogue signal U4 is finally read in from the control device 17.

The D flip-flop 16 is arranged parallel to this path. The square wave signals S1 and S2 from the comparators 11 and 12 are fed into the D flip-flop 16. The D flip-flop 16 generates the digital signal S4. The signal S4 is logically 1 when the square wave signal S2 is operating faster than square wave signal S1, otherwise the signal S4 is logically 0, which indicates a blade-conductor contact. The control device 17, which may also be part of the circuit arrangement 28, controls the frequency generator 3 on the basis of signal U4 and S4 in such a way that the LC resonant circuit oscillates preferably slightly lower than its natural resonance without conductor contact and is thus able to respond sensitively to in increase in capacitance caused by any chance contact with the conductor.

FIGS. 6a to 6c show a schematic flowchart of an insulation-stripping process. When the insulation is stripped from a cable 5, in a first step (see FIG. 6a) the cable is typically introduced in the direction of the arrow between the open tools, which in the present case are embodied as blades 2ra, 2rb. As soon as the cable 5 from which the insulation is to be stripped is in the corresponding position, it is held fast by a suitable apparatus, typically by means of centring jaws (not shown here). It is also conceivable that the cable 5 is first held fast in the suitable apparatus and then placed between the tools by said apparatus. At this time, the blades 2ra, 2rb are already oscillating in readiness for measurement, preferably slightly faster than the frequency generator. The blades 2ra, 2rb are moved towards each other in the direction of the arrow (FIG. 6b) and begin cutting into the electrically non-conductive cladding 5a. If the blades 2ra, 2rb are moved too close to each other, one or both of the blades 2ra, 2rb come into contact with the electrical conductor 5b.

As explained with reference to FIG. 3 and FIG. 5, if the resonant circuit is detuned by this blade-conductor contact, the phase position S4 and the signal U4 change abruptly according to the phase shift of the stator-side resonant circuit signal U25 from faster to slower than the frequency generator signal U1, thereby enabling detection of the contact.

In order to terminate the insulation-stripping process, the blades 2r are typically opened again slightly after they have cut sufficiently deeply into the electrically non-conductive cladding 5a. Then, the electrically non-conductive cladding 5a is removed from the electrical Conductor 5b. This is typically effected by the movements of the blades 2ra, 2rb relative to the cable 5 along the longitudinal axis of the electrical conductor 5b (FIG. 6c), for example by movement of the centring jaws or movement of the blades 2ra, 2rb. In this way, the electrically non-conductive cladding 5a is stripped off the electrical conductor 5b.

Figure 7A:
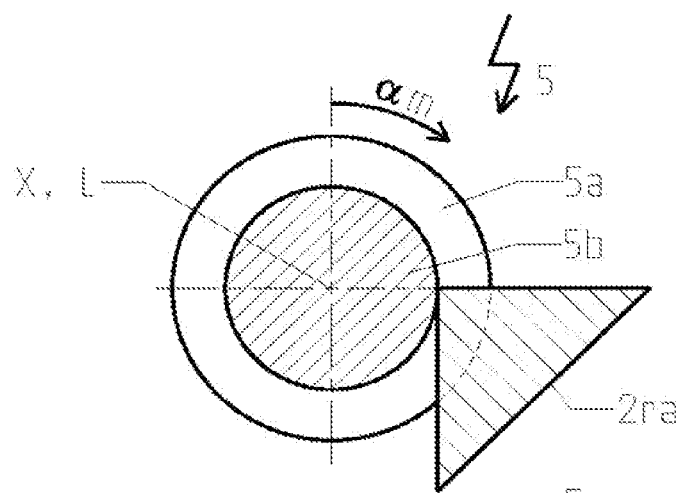
FIGS. 7a to 7d show a cross section through a conductor and a schematic flowchart for correcting an eccentricity.

FIGS. 7a to 7d show cross sections through a conductor 5b and a schematic flowchart of the tangential cut method for measuring an eccentricity and the diameter of the electrical conductors as well as for correcting the eccentricity of the electrical conductor 5b with respect to the rotation axis. FIG. 7a shows a cross section through a cable 5. FIG. 7a shows an ideal representation of the cable 5. The cable 5 consists of an electrically non-conductive cladding 5a and a conductor 5b. The conductor 5b is arranged coaxially with the electrically non-conductive cladding 5a. Since the cable is held fast by its cladding to so that is can be processed centrally with the rotation axis X, for example by centring jaws (not shown here), the axis of the conductor 5b is thus coincident with the rotation axis X. The cross section through the cable 5 according to FIG. 7a represents the ideal situation. The blade 2ra in FIG. 7a has already cut into the electrically non-conductive cladding 5a rotationally by being also moved towards the rotation axis X in small increments during each revolution while rotating about the conductor 5b. The blade 2ra is not currently touching the conductor 5b. A soon as the blade 2ra is advanced further towards the rotation axis X, the blade 2ra comes into contact with the conductor 5b. As the blade 2ra rotates around the conductor 5b in the direction of the arrow, it no longer loses contact with the conductor 5b and cuts into the conductor 5b to the same depth around the entire circumference thereof.

Figure 7B:
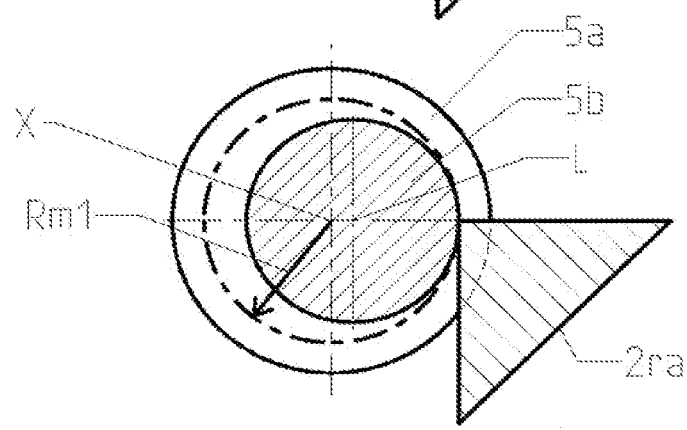

FIG. 7b shows the cross section of a cable 5 which, unlike FIG. 7a, has developed a symmetry deviation caused by the manufacturing conditions and is thus often encountered in practice. The cable 5 according to FIG. 7b has the same construction as the cable 5 according to FIG. 7a. However, the conductor 5b is disposed eccentrically with respect to its electrically non-conductive cladding 5a. In an insulation-stripping process as described here, the blade rotates in the direction of the arrow (see FIG. 7a) about the rotation axis X. In the present case, the rotation axis is coincident with an axis of symmetry of the electrically non-conductive cladding 5a, but not with the conductor axis L. As a consequence, as the blade 2ra rotates about the conductor and is also advanced in small increments per revolution towards the rotation axis X, the blade 2ra touches the conductor 5b for the first time at a point which is located farthest from the rotation axis X for a blade-conductor contact. At this point in time, the polar disposition of the blade 2ra, i.e. the angle αm and the distance of the blade 2ra from the rotation axis X can be read out. This corresponds to a first contact radius Rm1 and a first contact angle αm1.

Figure 7C:
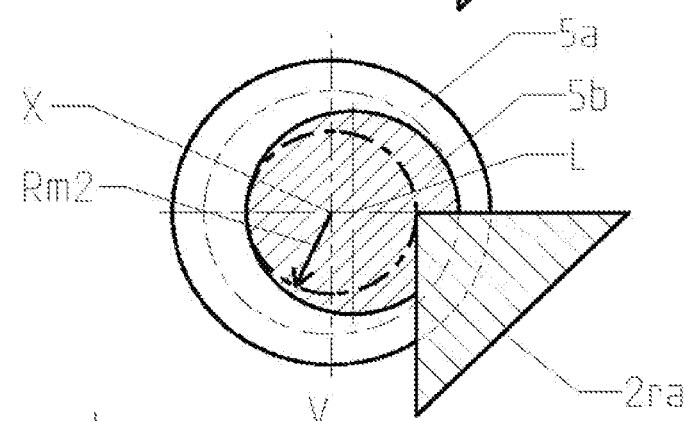

FIG. 7c shows the cross section of the cable 5 from FIG. 7b. In FIG. 7c, the blade 2ra has already been moved further towards the rotation axis X. At the point in time illustrated in FIG. 7c, the blade 2ra has been in contact with the conductor 5b for a complete revolution of the blade 2ra about the conductor 5b. This means that the point in time at which an uninterrupted contact between blade 2ra and the conductor 5b can be determined is the point in time at which the blade 2ra is at a greatest possible radial distance from the rotation axis X for a continuous blade-conductor contact. This corresponds to a second contact radius Rm2.

An eccentricity vector V (see FIG. 7d) can be calculated on the basis of the contact radius Rm1, the contact radius Rm2 and the first contact angle αm1.

Figure 7D:
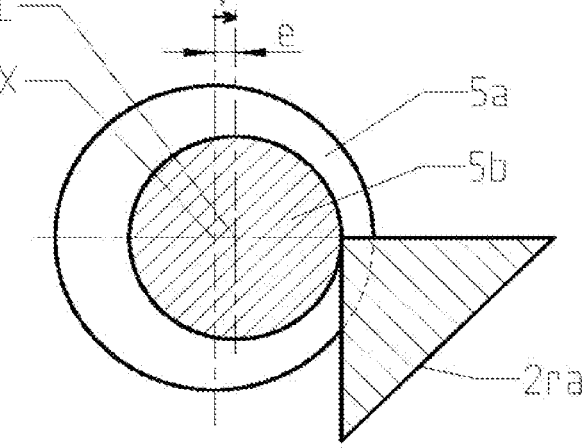

FIG. 7d shows a cross section through the cable 5 of FIG. 7b, in which the eccentricity of conductor axis L relative to rotation axis X of the cable 5 has been corrected. The cable 5 was shifted in accordance with the calculated eccentricity vector V in such manner that the conductor axis L is coincident with the rotation axis X. The axis of symmetry of the electrically non-conductive cladding 5a is thus also shifted with respect to rotation axis X in accordance with the calculated eccentricity vector V. Regarding the conductor 5b and the blade 2ra, this arrangement now corresponds to the ideal arrangement as illustrated in FIG. 7a. The shifting of the cable 5 may be effected by displacing the centring jaws or the apparatus, which is equipped with means designed to clamp or secure the cable 5.

Figure 8A:
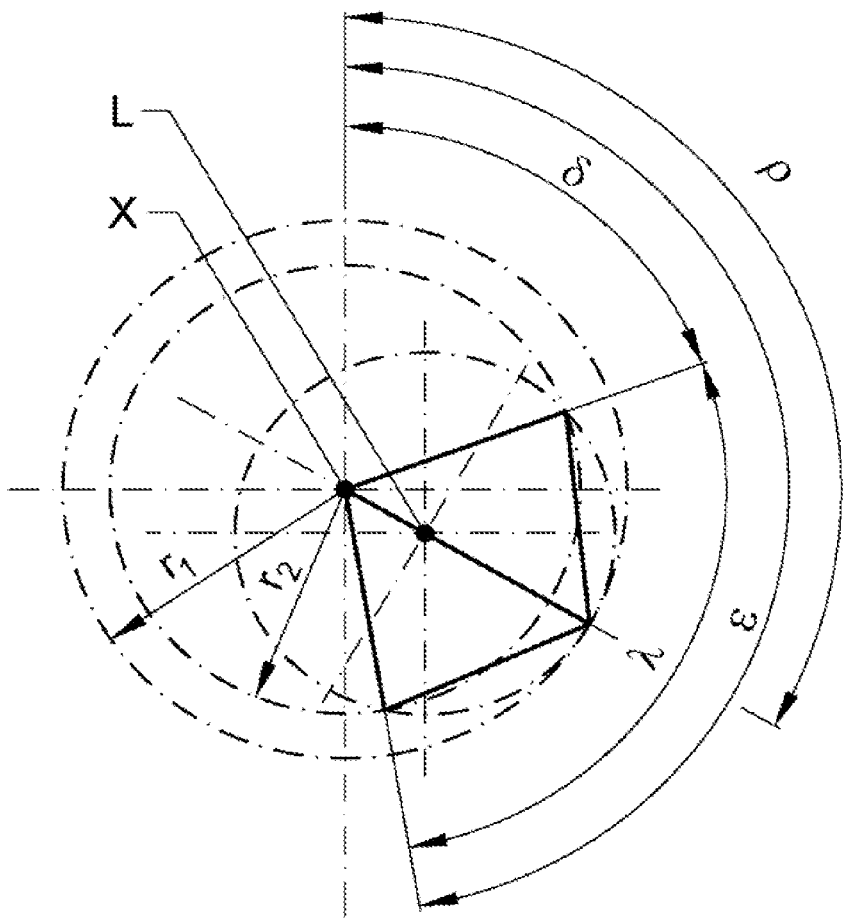
FIGS. 8a to 8b show a cross section through a conductor and a schematic flowchart for correcting an eccentricity.

FIG. 8a with 8b illustrates the sickle cut method, further, universal method for measuring an eccentricity, an eccentricity vector and a conductor radius, as was presented in the notes on FIGS. 7b and 7c. As with the tangential cut method illustrated in FIGS. 7b to 7d, the source of the eccentricity is unimportant, whether from conductor to cable insulation, cable holding apparatus to rotation axis or from the cumulative effects of myriad mechanical asymmetries or anomalies. With the sickle cut method, a conductor 5b can also be replaced by a metal pin with the result that a measured eccentricity e can be related solely to the eccentricity of main axis of the cable holding apparatus relative to the rotation axis X. Unlike FIG. 7b, FIG. 8a shows only a cross section through the conductor 5b with its longitudinal axis L. As may be apparent from FIG. 8a, the longitudinal axis L is arranged out of alignment relative to the rotation axis X. In order to determine the eccentricity (e) and/or the eccentricity vector (V) and/or the conductor radius (rL), as also described with reference to FIG. 7b the blade 2ra is moved towards the rotation axis X with simultaneous rotation of the blade until the blade 2ra touches the conductor 5b. From this first contact, the first contact radius r1 is obtained, which corresponds to the radius Rm1 from FIG. 7b, and the first contact angle αm1, which is not needed for determining the eccentricity vector in the sickle cut method but may also be measured to provide a plausibility check. In a next step, while the blade 2ra is rotating the blade 2ra is advanced towards the rotation axis X by a certain amount and is then located at a second distance from the rotation axis X. This second distance corresponds to the sickle cut radius r2. The sickle cut radius r2 is chosen such that the conductor 5b is cut through a sickle cut angle λ of preferably 120° to 200° for measurement purposes. With reference to a selected rotation angle zero point, the first sickle cut contact angle δ indicates the angle at which blade-conductor contact begins on the sickle cut radius r2, and the last sickle cut contact angle ε indicates the angle at which a blade-conductor contact ends on the second cut radius r2. The angle enclosed between these two values is the sickle cut angle λ. From this, an average contact angle ρ relative to the aforementioned rotation angle zero point can be calculated, which divides the sickle-shaped conductor cut into two symmetrical halves. This average contact angle ρ of the sickle cut corresponds to the first contact angle αm1 from FIG. 7, but as the average from the first sickle cut contact angle δ and the last sickle cut contact angle ε the average contact angle ρ of the sickle cut can be determined more precisely. The average contact angle ρ may also be calculated as the centroid of the line of the sickle cut. An eccentricity e and/or an eccentricity vector V can be calculated from the corresponding data. While the blade passes through the sickle cut angle λ, a measurable blade-conductor contact takes place. The sickle cut angle λ and the average contact angle ρ can be determined from the angles ε and δ, and the conductor radius rL can be calculated from the geometric relationships as illustrated in FIG. 8 using the following formulas:

$$\lambda = \varepsilon - \delta \quad \alpha = \frac{\lambda}{2} \quad r_L = \frac{r_1^2 + r_2^2 - 2r_1 r_2 \cos\alpha}{2(r_1 - r_2 \cos\alpha)}$$

Figure 8B:
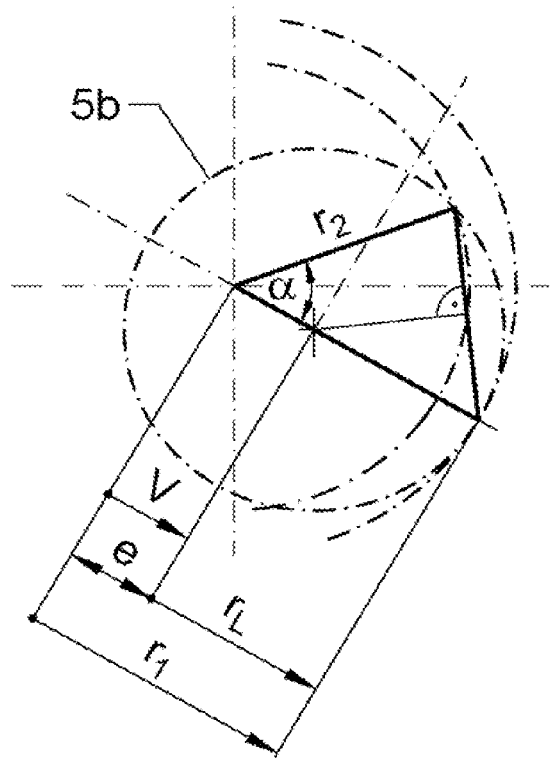

Thus, according to FIG. 8b the eccentricity e, the average contact angle ρ and the eccentricity vector V can also be calculated:

$$e = r_1 - r_l \quad \rho = \frac{(\delta + \varepsilon)}{2} \quad V = \vec{e} = e_L \rho$$

According to the method for measuring eccentricity described with the aid of FIG. 7c, the conductor is cut to a depth at which a continuous blade-conductor contact occurs. In the above formula for rL, this means that a is equal to 180°. It follows that for this limit value rL is equal to:

$$r_L = \frac{r_1^2 + r_2^2 - 2r_1 r_2 \cdot (-1)}{2(r_1 - r_2 \cdot (-1))} = \frac{r_1^2 + 2r_1 r_2 + r_2^2}{2(r_1 + r_2)} = \frac{(r_1 + r_2)^2}{2(r_1 + r_2)} = \frac{r_1 + r_2}{2}$$

This result is represented graphically in FIG. 7c, with Rm1=r1 and Rm2=r2.

An eccentricity vector may also be calculated from inductive measurement values obtained for example from coils placed in centring jaws. Such an arrangement has the advantage that the eccentricity of the conductor axis with respect to the rotation axis can be corrected even before cutting starts.

The coils for calculating the eccentricity vector may also be mounted concentrically with the rotation axis X in a separate sensor housing outside the centring jaws.

Moreover, an eccentricity vector may also be calculated from at least two X-ray images which capture the cable cross section.

Like the technical content of the patent claims and figures, the list of reference signs is an integral part of the disclosure. Identical reference signs stand for identical components, reference signs with different indices denote components that are functionally equivalent, share a commonality or are similar.

LIST OF REFERENCE SIGNS

1r Tool holder
2ra, 2rb Electrically conductive tool, blade
3 Frequency generator
4r Electrical conductors of the rotor-side circuit element
4s Electrical conductors of the stator-side circuit element
5 Cable
5a Electrically non-conductive cladding 5b Electrical conductor
6r Hollow shaft
7 Phase detector
10 Insulation-stripping head
11 Comparator
12 Comparator
13 XOR gate
14 Low pass filter
15 Amplifier
16 D flip-flop
17 Control device
20 Drive unit
28 Circuit arrangement
30 Drive unit
40 Electrical insulation
41 Electrically conductive plates
50 Frame
51 Mounting plate
100 Insulation stripping machine
A Rotor-side circuit element
Am Amplitude value of U2s
B Stator-side circuit element
C2r Tool capacitance
C4r Conductor capacitor of the rotor-side circuit element
C4s Conductor capacitor of the stator-side circuit element
C5 Conductor capacitor of the cable to be processed
Ca Output capacitor
COM Communication interface
Ct Total capacitance
ECB Electrically Conductive Body
e Eccentricity, distance from rotation axis to conductor axis
f Frequency
L Longitudinal axis of conductor
L1 Rotor-side coil, rotor-side inductive element
L2 Stator-side coil, stator-side inductive element
Rm1 First contact radius
Rm2 Second contact radius
Rv Series resistor
r1 First contact radius
r2 Sickle cut radius
rL Conductor radius
S1 Square wave signal
S2 Square wave signal
S3 Square wave signal, pulse width proportional to phase
S4 Signal, digital, phase position
S5 Control signal for the frequency generator
U1 Frequency generator signal
U2s Stator-side resonant circuit signal
U2r Rotor-side resonant circuit signal
U4 Analogue signal proportional to phase shift
V Eccentricity vector
X Rotation axis
α Half sickle cut angle
αm Rotation angle of a blade (0-360°)
αm1 First contact angle of a blade (0-360°)
δ First sickle cut contact angle
ε Last sickle cut contact angle
φ Phase shift
λ Sickle cut angle
ρ Average contact angle

The invention claimed is:
1. A device for detecting contact with an electrical conductor (5b) by at least one electrically conductive tool (2r) rotating around the electrical conductor (5b), the device comprising a tool holder (1r) which is rotationally mounted about a rotation axis (X), and the tool (2r) is arranged on said tool holder (1r),
an electrically conductive body (ECB) which is arranged on the tool holder (1r) and is electrically insulated from the tool (2r) by electrical insulation (40, 40a, 40b),
a rotor-side inductive element (L1) which is arranged on the tool holder (1r) or on the hollow shaft,
a parallel resonant circuit with at least one rotor-side circuit element (A) and at least one stator-side circuit element (B),
a circuit arrangement (28),
a stator-side inductive element (L2),
wherein the rotor-side inductive element (L1) is electrically connected to the tool (2r) and at least to the electrically conductive body (ECB) via electrical conductors (4r), and form parts of the rotor-side circuit element (A) of the parallel resonant circuit,
at least the stator-side inductive element (L2) is arranged in the stator-side circuit element (B) of the parallel resonant circuit,
the stator-side circuit element (B) of the parallel resonant circuit is connected via electrical conductor (4s) to the circuit arrangement (28) for determining the change in at least one characteristic oscillation parameter (φ, Am, f),
the parallel resonant circuit has a total capacitance (Ct) which functionally comprises at least the tool capacitance (C2r),
the rotor-side inductive element and the stator-side inductive element are arranged in such a way that at least one of the characteristic oscillation parameters (φ, Am, f) of the parallel resonant circuit can be measured independently or depending on a defined function on a rotation speed of the tool holder (1r) relative to the circuit arrangement, the rotor-side and the stator-side inductive elements are embodied as coils (L1, L2), and said coils (L1, L2) are inductively coupled with each other.

2. The device according to claim 1, wherein the tool (2r) is embedded between two conductive plates (41), which are electrically connected to the rotor-side inductive element (L1), via the electrical conductors (4r), and are electrically insulated from the electrically conductive body (ECB) by electrical insulations (40a, 40b), and/or that the tool (2r) is connected to the rotor-side inductive element (L1) by at least one electrical sliding contact formed by the electrically conductive plates (41) and the tool (2r), and via the electrical conductors (4r).

3. An insulation stripping machine with at least one insulation-stripping blade as a tool (2r), which is held fast by a tool holder which is rotationally mounted about a rotation axis, and with at least one device for detecting contact of an electrical conductor (5b) of a cable (5) according to claim 1, wherein the device is connected to at least one of the tools (2ra, 2rb).

4. The device according to claim 1, wherein the rotor-side and the stator-side inductive elements are arranged coaxially with the rotation axis (X) of the tool holder (1r), and the rotor-side and the stator-side inductive elements at least partially axially overlap each other,
and/or
the stator-side inductive element and the rotor-side inductive element are each embodied as a toroidal coil, and the two toroidal coils either at least partially or completely overlap each other, and/or that the rotor-side and/or the stator-side inductive element is/are embodied as single-layer or multilayer coils (L1, L2).

5. The device according to claim 4, wherein the rotor-side and the stator-side inductive elements have a cylindrical or plane-parallel structure coaxially with the rotation axis (X) of the tool holder (1r).

6. The device according to claim 4, wherein the rotor-side and/or stator-side inductive element(s) is/are embodied as a winding or as a spiral imprint of an electrical conductor on an electrically non-conductive and non-magnetic material.

7. The device according to claim 4, wherein the rotor-side and/or stator-side inductive element(s) contain(s) a ferromagnetic material to improve the coupling.

8. A method for detecting contact of an electrical conductor (5b) conductor, by the at least one electrically conductive tool (2r) rotating around the electrical conductor (5b), with a device, wherein the device comprises:
   a tool holder (1r) mounted rotationally about a rotation axis (X), wherein the tool (2r) is arranged on said tool holder (1r),
   an electrically conductive body (ECB), wherein this is arranged on the tool holder (1r), and preferably comprises the tool holder (1r) itself and a hollow shaft (6r) and is electrically insulated against the tool (2r),
   a rotor-side inductive element (L1) which is arranged on the tool holder (1r) or on the hollow shaft,
   a parallel resonant circuit with at least one rotor-side circuit element (A) and at least one stator-side circuit element (B),
   a stationary circuit arrangement (28),
   a stator-side inductive element (L2),
      wherein the rotor-side inductive element (L1) is electrically connected to the tool (2r) and at least to the electrically conductive body (ECB) via electrical conductors (4r), and form elements of the rotor-side circuit element (A) of the parallel resonant circuit,
      at least the stator-side inductive element (L2) is arranged in the stator-side circuit element (B) of the parallel resonant circuit,
      the stator-side circuit element (B) of the parallel resonant circuit is connected to the circuit arrangement (28) via electrical conductors (4s) in order to determine the change in at least one characteristic oscillation parameter ($\varphi$, Am, f) of the parallel resonant circuit,
      the parallel resonant circuit has a total capacitance (Ct) which functionally comprises at least the tool capacitance (C2r), and
   the method comprising the steps of:
   setting a frequency generator signal in accordance with a defined sensitivity in the range of the resonant frequency,
   measuring at least one characteristic oscillation parameter ($\varphi$, Am, f) of the parallel resonant circuit and determining the limit value thereof for contact of the conductor (5b) by the tool (2ra, 2rb)
   rotating the tool holder (1r) relative to the stationary circuit arrangement,
   continuously measuring at least this characteristic oscillation parameter ($\varphi$, Am, f) of the parallel resonant circuit, and comparing these measurement values with the one or more limit value(s) defined by reference measurements to detect a contact of the conductor (5b) by the tool (2ra, 2rb).

9. The method according to claim 8, wherein a signal is output when the limit value is reached, and advantageously at least one function of the device is controlled by the signal.

10. The method according to claim 8, wherein the circuit arrangement (7) evaluates the phase position (S4) and/or the phase shift ($\varphi$) between the stator-side resonant circuit signal (U2s) and the frequency generator signal (U1).

11. The method according to claim 8, wherein the point in time of contact of the conductor (5b) by the tool (2r) and a duration of the contact of the conductor (5b) by the tool (2r) are captured, and/or that the location of contact of the conductor (5b) by the tool (2r) in a direction of the rotation axis (X) is captured.

12. The method according to claim 11, wherein the point in time of the contact of the conductor (5b) by the tool (2ra, 2rb) and the duration of the contact of the conductor (5b) by the tool (2ra, 2rb) is captured separately for each tool (2ra, 2rb).

13. The method according to claim 12, wherein a distance from the tool (2ra) to the rotation axis (X) is reduced until a first point of tangential contact of the conductor (5b) by the tool (2ra) occurs and the angular position ($\alpha$m1) of the tool (2ra) as well as the disposition of the tool (2ra) is saved to memory, the disposition of the tool (2ra) corresponds to an associated first contact radius (Rm1, r1), and a distance from the tool (2ra) to the rotation axis (X) is further reduced until a continuous contact of the conductor (5b), by the tool (2ra), occurs for one complete revolution of the tool (2ra) about the conductor and the disposition of the tool (2ra) is saved to memory as a second contact radius (Rm2), and a respective contact diameter (Rm1) is calculated for each tool (2ra, 2rb) so that the tools (2ra, 2rb) can be adjusted radially relative to the rotation axis (X) in such a manner that each tool (2ra, 2rb) is at the same distance from the rotation axis (X).

14. The method according to claim 8, wherein the disposition of the tool is captured and is determined for the point in time of contact of the conductor (5b) by the tool (2r) on the basis of the corresponding blade opening and the cable diameter,
   and/or
      an angular position (am) of the one or more monitored tools (2ra, 2rb), relative to the rotation axis (X), is captured.

15. The method according to claim 14, wherein a distance from the tool (2ra) to the rotation axis (X) is reduced until a first point of tangential contact of the conductor (5b), by the tool (2ra), occurs and this is saved to memory as the first contact radius (Rm1, r1), and the distance from the tool (2ra) to the rotation axis (X) is further reduced to a sickle cut radius (r2), until a contact of the conductor (5b) by the tool (2ra) occurs, and a start of the contact is saved to memory, as the first sickle cut contact angle ($\sigma$), and an end of the contact is saved to memory as the last sickle cut contact angle ($\varepsilon$), and/or
      a conductor radius (rL) and/or an eccentricity (e) and/or an eccentricity vector (V) is/are calculated from the first contact radius (r1), the sickle cut radius (r2), the first sickle cut contact angle ($\sigma$) and the last sickle cut contact angle ($\varepsilon$).

16. The method according to claim 14, wherein the electrical conductor (5b) is an electrically conductive layer of a coaxial or a triaxial cable, and the steps for single layers of the coaxial or triaxial cable are repeated and in this way so that diameters and/or eccentricity vectors (V) of the individual conductive layers are determined.

17. The method according to claim 14, wherein a distance from the tool (2ra) to the rotation axis (X) is reduced until a first point of tangential contact of the conductor (5b) by the tool (2ra) occurs and the angular position ($\alpha$m1) of the tool (2ra) as well as the disposition of the tool (2ra) is saved to memory, the disposition of the tool (2ra) corresponds to an associated first contact radius (Rm1, r1), and/or a distance from the tool (2ra) to the rotation axis (X) is further reduced until a continuous contact of the conductor (5b), by the tool (2ra), occurs for one complete revolution of the tool (2ra) about the conductor and the disposition of the tool (2ra) is saved to memory as a second contact radius (Rm2).

18. The method according to claim 17, wherein an eccentricity vector (V) is calculated from the first contact radius (Rm1) and the second contact radius (Rm2) and the angular position ($\alpha$m1).

19. The method according to claim 18, wherein the conductor (5b) is shifted relative to the rotation axis (X) on a basis of the eccentricity vector (V) in such a manner that an eccentricity is compensated.

20. A method for detecting contact of the electrical conductor (5b) conductor by at least one electrically conductive tool (2r) rotating around the electrical conductor (5b), with the insulation-stripping machine according to claim 3, wherein an insulation stripping machine comprises with at least one insulation-stripping blade as a tool (2r), which is held fast by a tool holder which is rotationally mounted about a rotation axis, and with at least one device for detecting contact of an electrical conductor (5b) of a cable (5), and the device is connected to at least one of the tools (2ra, 2rb), and the method comprising the steps of:

setting a frequency generator signal in accordance with a defined sensitivity in the range of the resonant frequency, measuring at least one characteristic oscillation parameter ($\varphi$, Am, f) of the parallel resonant circuit and determining the limit value thereof for contact of the conductor (5b) by the tool (2ra, 2rb)

rotating the tool holder (1r) relative to the stationary circuit arrangement, continuously measuring at least this characteristic oscillation parameter ($\varphi$, Am, f) of the parallel resonant circuit, and comparing these measurement values with the one or more limit value(s) defined by reference measurements to detect a contact of the conductor (5b) by the tool (2ra, 2rb).

* * * * *